Feb. 8, 1949.  A. DI GERONIMO  2,461,040
BOTTLE CAP REMOVER
Filed Dec. 13, 1945

INVENTOR.
ARMAND DI GERONIMO
BY
Robert A Halvorsen

Patented Feb. 8, 1949

2,461,040

UNITED STATES PATENT OFFICE 2,461,040

BOTTLE CAP REMOVER

Armand Di Geronimo, Ozone Park, N. Y.

Application December 13, 1945, Serial No. 634,670

1 Claim. (Cl. 81—330)

The object of this invention is to provide a simple, inexpensive device for the easy removal of standard metal bottle caps.

The present large scale use of such bottle caps to seal bottles containing beverages and other liquids has resulted in the development of many devices for the removal of said caps. This invention covers an improvement in that type of bottle opener which is permanently fastened to a supporting surface.

The chief advantage of this improved design lies in its simplicity and low cost of manufacture.

It is common in this art to remove bottle caps by means of a device which is fastened by screws to a supporting surface. The improvement embodied in this invention resides in the use of a common screw to provide the strength necessary to remove the cap.

Other objects and advantages of the invention will be indicated in the detailed description which follows, which refers to the accompanying drawings, in which.

Figure 1:
Figure 1 is a front view of a preferred embodiment.

Referring specifically to the drawings, there is shown a supporting surface 1 to which is fastened a screw 2 having a head 3. Said screw 2 is guided during its insertion, into a preferred angular relation and spacing with respect to surface 1 by means of a formed strip 5. The particular shape of strip 5 may be greatly varied within the scope of this invention, but that shown at 5 is deemed preferable by reason of its economy of manufacture.

The essential features of strip 5 are that it has means for rigidly fastening it to supporting surface 1 before the insertion of screw 2, and that it effectively guides screw 2 during the insertion thereof.

Since the stresses developed during the removal of the bottle cap are applied directly to screws 2 and 8, it is obvious that strip 5 may be made of inexpensive, easily formed, light gage metal, plastic or fiber.

Figure 2:
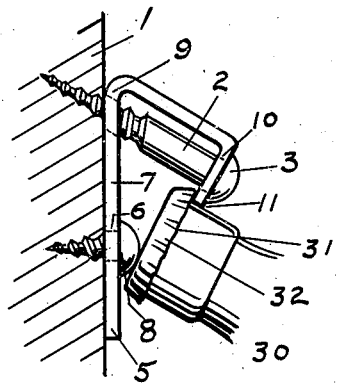
Figure 2 is a side view of the same device, showing the angular and lateral relationships of the elements of the device, and the position of a bottle during the operation of the device.

These features are provided in embodiment 5 by the provision of a hole 6 in flat section 7 through which a screw 8 is passed to initially fasten the strip 5 to the supporting surface. Screw 2 is guided during its insertion by two holes 9, 10 which are provided in flat section 7 and in a bent lip 11 which is formed in strip 5. The spacing of screws 2 and 8 should be approximately as shown in Figure 2, in order that the head of screw 8 will resist the upward tendency of the bottle cap during its removal.

Figure 3:
Figures 3 and 4 are front and side views respectively, of a modification wherein a tube is formed by bending in the edges of a metal strip, to locate a screw for removing bottle caps.
Figure 4:
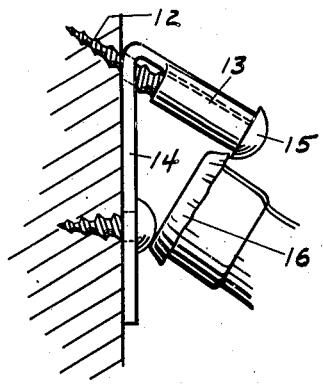

In the modification shown in Figures 3 and 4, the screw 12 is guided by a tubular portion 13, formed on the strip in angular relation to the flat section 14. In this embodiment, the head 15 of screw 12 is used to strip off the bottle cap 16, and must have a sharp lower edge such as provided by round or oval head wood screws or lag screws.

Figure 5:
Figures 5 and 6 are front and side views respectively, of a modification wherein a plastic molding is used as a jig for the proper positioning of two screws one of which removes bottle caps.
Figure 6:
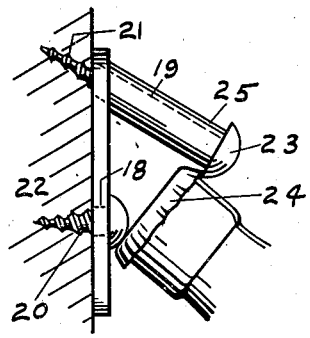

Figures 5 and 6 show a modification in which the strip is molded of a plastic material and has holes 18, 19 to locate screws 20, 21 during the insertion of said screws in supporting surface 22. As in the previous modification, screw 21 must have a head 23 which has a sharp lower edge for engaging bottle cap 24, and which has an outside diameter appreciably larger than the tubular section 25.

In the operation of the preferred embodiment a bottle 30 is placed so that the edge 31 of cap 32 is caught under lip 11 of strip 5. Screw 8 is preferably located so that it engages an upper edge of cap 32 diametrically opposed to the point where it is caught by lip 11. This insures a rapid removal of the cap by the maximum possible lever action between said screws, and by preventing any tendency of the cap to move upwardly in reaction to the downward force exerted on lip 11.

The operation of the modifications shown in Figures 3, 4, 5 and 6 is similar, except that the edge of the bottle cap is engaged directly by the lower sharp edge of the screw.

It is obvious that the major elements in each modification are two standard screws, plus a jig whose important function is to guide the two screws into proper angular and lateral relation. The extreme economy of this arrangement makes for a very wide utility.

It is clear that the simplicity of construction and the efficient operation of this invention is a substantial improvement over previous devices.

I claim:

A bottle cap remover comprising two screws adapted for insertion into a supporting surface, and a jig arranged to properly guide said screws during the insertion thereof, said jig comprising a flat portion having a hole through which one of said screws is inserted to rigidly fasten said flat portion to the supporting surface, a second hole in said flat portion, an inclined portion extending away from said flat portion and in a line adjacent said second hole and having a lip at its outer end at substantially right angles to said inclined portion, said lip extending in the general direction of the first mentioned hole in the flat portion and spaced from said flat portion a distance sufficient to engage the lower edge of the cap to be removed and a hole in said lip which together with said second hole is adapted to guide the other screw during its insertion into said supporting surface the head of said one screw forming an abutment for said cap and cooperating with said lip to locate the bottle cap there between preparatory to its removal, the said other screw having a head engaging the outer surface of said lip to reinforce the same and to resist outward bending of the lip during the cap removing operation.

ARMAND DI GERONIMO.

REFERENCES CITED

The following references are of record in the file of this patent:

UNITED STATES PATENTS

| Number | Name | Date |
|---|---|---|
| 1,500,881 | Morairty | July 8, 1924 |
| 1,629,219 | Liles | May 17, 1927 |
| 1,756,730 | Crosby | Apr. 29, 1930 |
| 1,974,836 | Schilling | Sept. 25, 1934 |
| 1,975,472 | Mosgrove et al. | Oct. 2, 1934 |